J. J. McDONALD.
FERTILIZER DISTRIBUTER.
APPLICATION FILED MAY 18, 1914.
1,158,700.
Patented Nov. 2, 1915.
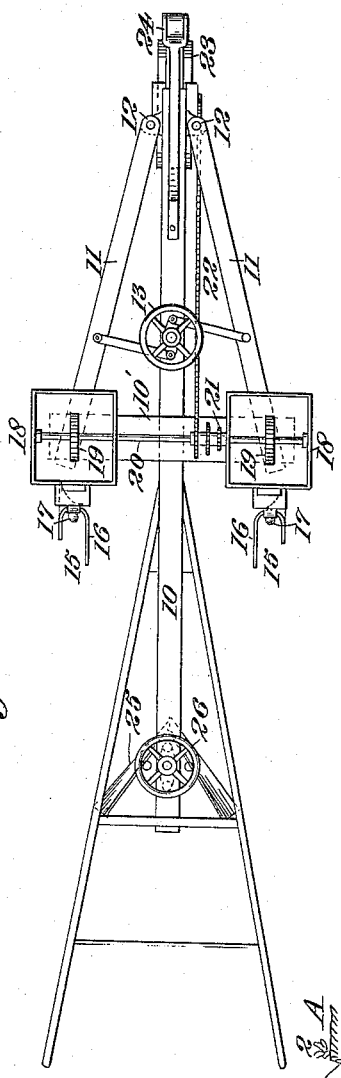
WITNESSES:
Charles Pickles
Thos. Eastberg
INVENTOR
John J. McDonald.
BY G. H. Strong.
ATTORNEY

UNITED STATES PATENT OFFICE.

JOHN J. McDONALD, OF MILPITAS, CALIFORNIA.

FERTILIZER-DISTRIBUTER.

1,158,700.  Specification of Letters Patent.  Patented Nov. 2, 1915.

Application filed May 18, 1914. Serial No. 839,274.

*To all whom it may concern:*

Be it known that I, JOHN J. McDONALD, a citizen of the United States, residing at Milpitas, in the county of Santa Clara and State of California, have invented new and useful Improvements in Fertilizer-Distributers, of which the following is a specification.

This invention relates to a fertilizing device and pertains especially to a fertilizer distributer for use in strawberry fields, and elsewhere where the fertilizer must be carefully deposited and as carefully covered over without injury to the plants, or the covering up of any of the foliage of the plants. In cultivating the strawberry plants, which lie very close to the ground, it is particularly necessary that none of the fertilizer or earth be thrown upon the leaves or plants, as it will cause their destruction.

The object of the invention is to provide a cultivator device, which will distribute and cover a fertilizer at the sides of a ditch running between two rows of strawberry plants and adjacent to the roots of the plants, without disturbing the plants or covering them.

The invention consists of the parts and the combination and construction of parts as hereinafter more fully described and claimed, having reference to the accompanying drawings, in which—

Figure 1 is a plan view of the invention; Fig. 2 is a side elevation of the same. Fig. 3 is a diagrammatic view showing the mode of application of the invention.

Strawberries are usually grown in hills indicated at A; there being two rows of plants 2 on each hill and the hills separated by an irrigating ditch 3. This cultivator is designed to run in a ditch and to deposit a fertilizer at one side and close to the roots of the plants, as at 4.

The apparatus itself is made adjustable as to width according to the distance between two adjacent hills, and includes a beam 10, with two adjustable side frames 11 which are pivoted at 12, and made adjustable toward and from each other by a hand-wheel 13, and connections as shown; 14 being a lock nut to lock the hand-wheel to the set adjustment. Each of the pivoted side beams 11 carries a hoe or furrow-opener 15, which is U-shaped in plan, with an elongated moldboard 16 to throw the dirt toward the center.

The fertilizer for each furrow-opener is distributed to it by a hose or flexible conduit 17 from a respective feed box 18. There are two of these feed boxes and feed connections, one for each hoe, and they are mounted on a cross-bar 10' on the beam 10. Each box contains an agitator 19 mounted on a shaft 20, and this shaft is driven at variable speed according to the rate of distribution of fertilizer needed, by suitable means, as to the step sprockets 21 and chain 22, running down to the front ground wheel 23. In order to keep the ground wheel in close contact with the ground, the whiffletree or traction means is attached at a relatively high point as 24, so that the pull is always downward.

The adjustable beams 11 are for the purpose of adapting the hoes or plows to rows or hills of different spacing. The refilling of the furrows made by the plows 15 is done by an adjustable A-shaped scraper 25, which is operated by a hand-wheel 26, similar to wheel 13; the scraper being made in two sections hinged at the apex as shown at 27.

The adjustment of the scraper sections 25 depends on the distance apart of the hoes or plows 16; with wider spaced rows the hoes are farther apart, and where the rows are closer together the hoes are moved in accordingly; the scrapers 25 in all cases being adapted to throw outward the earth, so as to cover the fertilizer and deposit it in the furrows made by the hoes 15.

From the foregoing it will be seen that the hoes or plows simultaneously open furrows, the flexible conduits deposit the fertilizer simultaneously in the furrows, and the adjustable scraper 25 simultaneously closes the fertilized furrows.

It is manifest that various changes may be made in the details of the invention without departing from the principle thereof.

Having thus described my invention, what I claim and desire to secure by Letters Patent is—

1. A fertilizer distributer comprising an apparatus having a pair of furrow openers adjustable toward and from each other, means for depositing fertilizer simultaneously in each furrow so opened, and an adjustable scraper in a plane between said furrow openers for simultaneously closing both furrows, said scraper comprising a pair of hinged sections adjustable about a vertical pivot.

2. A fertilizer distributer comprising a main beam having a ground wheel mounted on its forward end, a furrow opener mounted on each side of the main beam, a fertilizing container mounted above each furrow opener, means for conveying said fertilizer to the furrows, a revoluble agitator mounted in each container, a driving connection formed between the agitators and the front wheel, and a scraper centrally mounted behind the furrow openers to close the furrows.

3. A fertilizer distributer comprising a main beam, a hinged beam at each side of the main beam, means for adjusting the position of said beams with relation to the main beam, a furrow opener mounted on each hinged side beam, means for depositing fertilizer simultaneously in each furrow so opened, and an adjustable scraper carried by said main beam and adjustable independently of said side beams for closing both furrows.

In testimony whereof I have hereunto set my hand in the presence of two subscribing witnesses.

JOHN J. McDONALD.

Witnesses:
CHAS. A. PAGE,
CHAS. F. LIETZ.

Copies of this patent may be obtained for five cents each, by addressing the "Commissioner of Patents, Washington, D. C."